US007027406B1

(12) United States Patent
Shabtay et al.

(10) Patent No.: US 7,027,406 B1
(45) Date of Patent: Apr. 11, 2006

(54) DISTRIBUTED PORT-BLOCKING METHOD

(75) Inventors: Lior Shabtay, Ganei Tikva (IL); Moshe Island, Yehud (IL); Nachman Cohen, Tiberias (IL); Guy Kronenthal, Givat Shmuel (IL); Michael Saltzman, Saratoga, CA (US); Gidi Navon, Tel Aviv (IL); Ron Bin, Tel Aviv (IL)

(73) Assignee: Avaya Communication Israel Ltd., Tel Aviv (IL)

( * ) Notice: Subject to any disclaimer, the term of this patent is extended or adjusted under 35 U.S.C. 154(b) by 0 days.

(21) Appl. No.: 09/535,987

(22) Filed: Mar. 27, 2000

Related U.S. Application Data (63) Continuation-in-part of application No. 09/061,484, filed on Apr. 16, 1998, now abandoned.

(51) Int. Cl.
*H04L 12/26* (2006.01)

(52) U.S. Cl. .................. 370/252; 370/249; 370/256

(58) Field of Classification Search ............... 370/229, 370/230, 241, 241.1, 246, 247, 248, 250, 370/251, 252, 253, 254, 255, 256
See application file for complete search history.

(56) References Cited

U.S. PATENT DOCUMENTS

| 5,280,480 | A | * | 1/1994 | Pitt et al. ............. 370/256 |
| 5,734,824 | A | * | 3/1998 | Choi .................. 370/254 |
| 5,796,736 | A | * | 8/1998 | Suzuki ................ 370/254 |
| 5,878,232 | A |   | 3/1999 | Marimuthu |
| 5,959,968 | A | * | 9/1999 | Chin et al. ............. 370/216 |
| 6,032,194 | A | * | 2/2000 | Gai et al. .............. 709/239 |
| 6,202,114 | B1 | * | 3/2001 | Dutt et al. ............. 710/311 |

OTHER PUBLICATIONS

"Lucent Product Support", by Ori Bendori, /www.lannet.com/site/products/white/safwp-05.htm, pp. 1-7, available Aug. 3. 1999.
"Truncating tree timing", Mick Seaman, IEEE 802.1 interim meeting, Rev. 1.0 Monday, Jan. 11th, 1999, pp. 1-4.
"Speedy Tree Protocol", Mick Seamanm, IEEE 802.1 interim meeting, Rev. 1.0 Saturday, Jan. 16th, 1999, pp. 1-6.
Optimal Distributed Algorithms for Minimum Weight Spanning Tree, Counting, Leader Election, and Related Problems B. Awernuch, STOC 87, pp. 230-240.
"A distributed Algorithm for Minimum Weight Spanning Trees", R.G. Gallager, P.A. Humblet, and P.M. Spira, ACM Transactions on Programmning Languages and Systems, vol. 5, pp. 66-77, Jan. 1983.

(Continued)

*Primary Examiner*—Dang Ton
*Assistant Examiner*—Phuc Tran (57) ABSTRACT

A method of managing connectivity between an end-device and one of a plurality of bridging-devices connected to the end-device. The method includes transmitting test messages by each of the bridging-devices, transmitting test messages by the end-device, determining, in each of the bridging-devices, with which of the other devices there is an operative connection, based on the test messages the bridging-device receives and determining, in each of the bridging-devices, whether a port leading to the end-device should be in a forwarding or blocking state responsive to the determination of the operative connections.

53 Claims, 4 Drawing Sheets

OTHER PUBLICATIONS

"Standard for Local and Metropolitan Area Networks Supplement to Media Access Control (MAC) Bridges: Traffic Class Expediting and Dynamic Multicast Filtering", ANSI/IEEE Std 802.1P, 1997.

"Complexity of Network Synchronization", B. Awerbuch, Journal of ACM, vol. 32, No. 4, Oct. 1985, pp. 804-823.

"Supplement to ISO/IEC 15802-3 (IEEE Std 802.1D) Information technology—Telecommunications and information exchange between systems—Local and metropolitan area networks—Common Specifications—Part 3": Media Access Control (MAC) Bridges Rapid Configuration IEEE Draft P802.1 w/D2, 1999. pp. 1-9 (Should be i-ix), and 1-77.

* cited by examiner

DISTRIBUTED PORT-BLOCKING METHOD

RELATED APPLICATIONS

The present application is a continuation in part of U.S. patent application Ser. No. 09/061,484, filed Apr. 16, 1998, now abandoned, to Lior Shabtay, titled "Apparatus and method for Managing Communication Networks", the disclosure of which is incorporated herein by reference.

FIELD OF THE INVENTION

The present invention relates to communication networks and in particular to local area networks with redundancy.

BACKGROUND OF THE INVENTION

Generally, local area networks are used to connect a plurality of end-stations, e.g., computers, to each other and/or to one or more gateways which lead to wide area networks. In many cases the connections of the end-stations to each other and/or to a wide area network are very important and should not fail even for a few seconds. For example, the disconnection, even for a short period, of some Internet, banking, telephone and stock market servers may have severe economical consequences.

Local area networks generally comprise a plurality of bridging-devices (e.g., Ethernet switches, switch modules, bridges) and communication links. Each communication link connects between two or more bridging-devices or between one or more bridging-devices and one or more end-stations. Each bridging-device comprises a plurality of ports which serve as interfaces between the bridging-device and the links to which it is connected. As with other complex devices, bridging-devices and communication links may fail. Usually, the chances of a failure occurring increase with the complexity of the device.

The data passed through local area networks is generally packaged in frames (also referred to as packets), commonly having a length of up to about 1522 bytes. Many frames transmitted through local area networks are broadcast frames which are sent to most or substantially all the bridging-devices of the network. In the present application, broadcast frames refer to any frames distributed throughout a network, including frames which carry broadcast and multicast addresses and frames which carry addresses which are not recognized by the bridging-devices of the network. A commonly used broadcast scheme involves having a bridging-device, that receives a broadcast frame, forward the frame through all its ports, except the port through which the frame was received, and in some cases except ports especially defined as leading to devices not desiring to receive the frame. This broadcast scheme operates properly only if the ports and links do not form a loop in the network. If the network includes a loop of ports, a single frame may be repeatedly forwarded through the network and the network will fail. Such a situation is commonly referred to as a broadcast storm.

In many cases redundant links are added to networks, to be used in case one or more of the bridging-devices and/or links fail. A spanning tree algorithm (STA) is commonly used to block the ports leading to the redundant links and thus prevent the formation of loops. A blocking port (also referred to as a port in a blocked state, or as a blocked port) only sends and receives specific control frames (i.e., frames having the standard STA BPDU-address, as their destination address) and does not forward data frames at all. Usually, bridging-devices, which are reset or begin to operate, initially block all their ports. Then, the STA activates those ports which are to be used for forwarding data.

One common spanning tree algorithm is the 802.1D standard spanning tree algorithm (STA) which is described in "Information technology—Telecommunications and information exchange between systems—Local and metropolitan area networks—Media access control (MAC) bridges", International Standard ISO/IEC 15802-3, 1998, ANSI/IEEE Std 802.1D, 1998 edition, the disclosure of which is incorporated herein by reference. Faster STAs are described in "Speedy Tree Protocol" and "Truncating Tree Timing", both of which are by M. Seaman, IEEE 802.1 interim meeting, January 1999. Even these faster STAs require a few seconds to converge.

In some networks described, for example, in a white paper by Ori Bendori, titled "Lucent product support", and available at /www.lannet.com/site/products/white/safwp-05.htm, the disclosure of which is incorporated herein by reference, redundant links are handled locally by a single bridging-device, rather than by using an STA which is a distributed algorithm and is relatively complex. The bridging-device includes active ports and blocked ports. When a failure occurs in one of the active ports, a hardware indication is provided to the bridging-device which automatically activates a predetermined one of the blocked ports, and blocks the inoperative port. Thus, the failure is overcome relatively quickly.

Some end-station devices, however, such as telephony switchboards, include only a single external port with which they connect to a local area network. In order to ensure continuous connection of the end-station to the network, the end-station is connected to a plurality of bridging-devices through an Ethernet repeater, under the assumption that simple repeaters fail much more rarely than bridging-devices, which are relatively complex. In such a configuration it is not possible to use the method described in the Ori Bendori paper, as a single port connects the end-station to the bridging-devices. Therefore, the blocking must be performed by the plurality of bridging-devices cooperatively and not by a single device. In other cases it may be desired that the blocking be performed by the bridging-devices even when the end-station has more than one port. For example, in some cases it is not practical to change the end-station devices to operate in accordance with special, fast, port blocking methods.

In some cases a failure of a device or link may be partial, for example, a link may operate only in one direction and not in the other direction. Existing blocking methods do not always detect such partial failures. There are links which perform hardware tests in both directions before reporting that the link is operative. These hardware tests, however, do not catch all the possible problems which could cause the connection between two devices to be inoperative. Thus, in some cases messages are not properly transmitted from one bridging-device to the other although the hardware indicates the link is operative. Using the indications of the hardware may result in wrong operation of the STA in activating a port which should be blocked, which may cause a broadcast storm, or in blocking a port which should be active which results in a network disconnection.

A trivial solution involves sending hello messages between two bridging-devices of a network connected by a link, and determining the operability of the link based on whether the hello messages are received. This solution can be used on a link connecting only the two bridging-devices which transmit the hello messages or on a link connecting additional devices, for example, on a link connecting two bridging-devices and an end-station. The determination of the operability of the link may be performed based solely on the reception of the hello messages or based on a combination of the reception of the hello messages and on hardware indications. According to the operability determination the bridging-devices decide whether to block or activate their port to the link. This solution, however, has a few drawbacks. For example, if both the bridging-devices do not receive hello messages from each other due to a fault in the link, and the hardware does not detect the fault, both the bridging-devices may assume the other bridging-device is faulty and activate their ports. When the fault disappears a loop is formed and the network may suffer from a broadcast storm.

A broadcast storm may also result if a link operates only in one direction and the problem is not identified by the hardware.

Generally, STAs and other port blocking schemes define a primary topology which is active when the devices of the network are operative. When a failure occurs, the network reverts to a backup topology. When the failure is overcome, the network returns to the primary topology. This, however, causes an extra, unnecessary, switch of the network which interrupts the data flow in the network.

SUMMARY OF THE INVENTION

One aspect of some preferred embodiments of the present invention relates to a distributed port-blocking method for a plurality of bridging-devices connected through a common link (or through a repeater) to a single port of one or more end-stations (or any other devices). Preferably, the bridging-devices are assigned an operation order, preferably an arbitrary order. Each of the bridging-devices and the end-station continuously, at predetermined intervals, sends test frames through its port leading to the common link. The bridging-devices receive the test frames and determine when the test frames from one or more of the devices (i.e., bridging-devices and end station) are not received for over a predetermined interval. When test frames are received from all the devices, only the bridging-device which is highest in the operation order activates its port to the common link. When a device receives test frames from at least one bridging-device higher than it in the operation order, it blocks its port leading to the common link. When a device does not receive test frames from all the bridging-devices higher than it in the operation order, it activates its port leading to the common link.

Preferably, when a bridging-device does not receive test frames from the end-station (even if it receives test frames from the other bridging-devices) it blocks its port to the common link. Alternatively, when the bridging-device does not receive any test frames (neither from the end-station nor from the other bridging-devices) it blocks its port to the common link. However, when the bridging-device receives test frames from one or more other bridging-devices it disregards the fact that it did not receive test frames from the end-station, as the receiving of the test messages indicates that the receiving bridging-device is not at fault. Thus, at all times one port is kept open to the end-station such that when the end-station recovers it may immediately transmit frames which will be received by a forwarding port of a bridging-device. In addition, if a plurality of end-stations are connected through a single Ethernet repeater or other common link, and only one of the end-stations transmits test messages, the other end-stations which do not send test messages will be connected to the network including the bridging-devices, even if the end-station which transmits the test messages is inoperative.

An aspect of some preferred embodiments of the present invention relates to a distributed port-blocking method which operates on a network including one or more partially-participating devices (e.g., end-stations) which provide information used in determining which ports should be blocked, but do not participate in determining which ports should be blocked. Preferably, the one or more partially-participating devices do not run any software related to the port-blocking method. Preferably, the partially-participating devices send test messages to other, fully-participating, devices, only in response to response requests generated by the fully-participating devices. The test messages sent by the partially-participating devices are preferably standard messages which substantially every network device complying with widely accepted standards, can generate.

In a preferred embodiment of the present invention, the response requests are sent to the partially-participating devices using the actual MAC addresses and/or IP addresses of the partially-participating devices. Preferably, the IP and/or MAC addresses of the partially-participating devices are configured by a system manager into the fully-participating devices. In a preferred embodiment of the invention, the IP address is configured by a system manager and the MAC address is determined using standard address resolution protocol (ARP) methods. Alternatively, the fully-participating devices determine the addresses of the partially-participating devices based on normal traffic, unrelated to the port-blocking method, generated by the partially-participating devices.

In a preferred embodiment of the invention, the test messages sent by the partially-participating devices and/or the response requests sent to the partially-participating devices are sent with special addresses and/or other identifications which prevent their distribution throughout the network. In a preferred embodiment of the invention, the response requests are sent as unicast address resolution protocol (ARP) messages directed only to a single partially-participating device. Thus, the response requests are not distributed throughout the network.

In some preferred embodiments of the invention, at least some of the ports which should be blocked according to the port-blocking method, are moved to an emulated blocking state in which they do not forward messages but they send and receive test messages and/or response requests used by the port-blocking method.

An aspect of some preferred embodiments of the present invention relates to a distributed port-blocking method which does not cause an, operative, active port to be blocked. When a device which was not highest in the operation order activates its port to the common link, it continuously advertises that it is now the highest bridging-device in the operation order. According to a predetermined scheme, all the bridging-devices deduce from the advertisements a new operation order. A bridging-device preferably does not activate its port before it checks that it does not receive for a predetermined period, advertisements which would change its decision to activate the port. In a preferred embodiment of the invention, the advertisements are included within the test frames transmitted by the bridging-device highest in the operation order.

An aspect of some preferred embodiments of the present invention relates to a port-blocking method which is based on two way software testing of the communication between the devices of a network. Using two way software testing ensures that all malfunctions, even if they are only in a single direction, will be identified and ports will be blocked and/or activated accordingly to form an operative tree within the network. Preferably, in addition to test frames, each device transmits acknowledgment frames which report the receiving of the test frames. In a preferred embodiment of the invention, the acknowledgment frames transmitted by a bridging-device are embedded within the test frames transmitted by the bridging-device. A device which does not receive acknowledgments knows that its connection is inoperative, even if it receives test frames. Alternatively or additionally to transmitting acknowledgment frames, each bridging-device participating in the protocol transmits response requests to the other participating bridging-devices. The bridging-devices transmit test frames only in response to the response requests. Thus, a bridging-device receiving a test message knows that the connection on which the test message was received is operative in both directions.

There is therefore provided in accordance with a preferred embodiment of the invention, a method of managing connectivity between an end-device and one of a plurality of bridging-devices connected to the end-device, including transmitting test messages by each of the bridging-devices, transmitting test messages by the end-device, determining, in each of the bridging-devices, with which of the other devices there is an operative connection, based on the test messages the bridging-device receives, and determining, in each of the bridging-devices, whether a port leading to the end-device should be in a forwarding or blocking state responsive to the determination of the operative connections.

Preferably, the bridging-devices and end-device are connected through a common Ethernet repeater. In a preferred embodiment of the invention, at least one additional end-device is connected to the bridging-devices through the common Ethernet repeater. Preferably, the at least one additional end-device may transmit or not transmit test messages. Preferably, the end-device is connected to the bridging-devices through a single port of the end-device.

Preferably, transmitting the test messages by the end-device includes transmitting the messages in response to response requests from at least one of the bridging-devices. Preferably, transmitting the test messages by the end-device and/or the bridging-devices includes transmitting ARP messages. Preferably, transmitting the ARP messages by the end-device and/or the bridging-devices includes transmitting in response to unicast ARP requests.

Alternatively or additionally, transmitting the test messages by the end-device includes transmitting ICMP echo messages. Preferably, transmitting the test messages by the bridging-devices and/or by the end-device includes transmitting messages with BPDU destination addresses. Preferably, transmitting the test messages by the bridging-devices includes transmitting messages which include acknowledgments of test messages recently received from other bridging-devices. Alternatively or additionally, transmitting the test messages by the bridging-devices includes transmitting messages which include an indication of the protocol state of the port toward the end-device of the transmitting bridging-device.

Preferably, transmitting messages which include an indication of the protocol state of the port includes transmitting messages which include indication on whether the port is blocking, "moving to forward" or forwarding. Preferably, determining with which of the other devices there is an operative connection, based on the test messages the bridging-device receives includes making the determination based on whether the messages are received and/or based on the contents of the received messages.

Preferably, determining by a bridging-device with which of the other devices there is an operative connection includes considering a device as having an operative connection with the determining bridging-device if at least a predetermined percentage of the test messages expected to have been transmitted by the other device, are received over a predetermined period by the determining bridging-device.

Preferably, determining by a bridging-device with which of the other devices there is an operative connection includes considering a device as having an operative connection with the determining bridging-device if at least one of the test messages expected to have been transmitted by the other device, are received over a predetermined period by the determining bridging-device. Preferably, determining with which of the devices there is an operative connection includes considering a device as having an operative connection only if at least one of the test messages received from the other device over a predetermined period include acknowledgments of receiving test messages from the determining bridging-device.

Preferably, determining whether the port should be in forwarding or blocking state includes choosing the forwarding state if the connection with the end-device is operative and the connection to the other bridging-devices is inoperative or if the other bridging-devices did not choose the forwarding state.

Preferably, the bridging-devices are organized in a predetermined order and determining whether the port should be in the forwarding or the blocking state includes choosing the forwarding state if the connection with all the bridging-devices higher in the predetermined order are considered inoperative. Preferably, determining whether the port should be in forwarding or blocking state includes choosing the forwarding state only if no other bridging-device with operative connection to the end-device is in the forwarding state.

Preferably, the method includes moving a port which should be in the blocking state according to the determination, to an emulated blocking state in which at least some test messages carrying destination addresses other than the standard STA BPDU address may be transmitted and received through the port but substantially all messages received through the port are not forwarded through any other port of the bridging-device containing the emulated blocking port. Preferably, moving the port to the emulated blocking state includes moving the port to a state in which at least some test messages carrying destination addresses other than the standard STA BPDU address may be transmitted and received through the port to and from the processor of the bridging-device. Alternatively or additionally, moving the port to the emulated blocking state includes moving the port to a state in which substantially all messages received through other ports of the bridging-device are not forwarded through the emulated blocking state.

Alternatively or additionally, moving the port to the emulated blocking state includes moving the port to a state in which at least some of the messages received through the emulated blocking port are not passed to the processor. Alternatively or additionally, moving to a state in which at least some of the messages received through the emulated blocking port are not passed to the processor includes moving the port to a state in which broadcast and multicast messages received through the port are not passed to the processor. Alternatively or additionally, moving the port to the emulated blocking state includes moving the port to a state in which messages received through the emulated blocking port are not used in matching addresses to ports.

Preferably, moving the port to the emulated blocking state includes tagging all untagged messages received by the port as belonging to a VLAN to which none of the other ports of the bridging-device belong. Further preferably, moving the port to the emulated blocking state includes moving the port to a state in which the emulated blocking port transmits and receives only messages of a specific VLAN which is not supported by any of the other ports of the bridging-device.

There is further provided in accordance with a preferred embodiment of the invention, a method of preventing formation of loops in a network including a plurality of devices, each having one or more ports, connected by communication links, including transmitting test messages by the plurality of devices, determining in fewer than all the transmitting devices, which of the ports of the determining device should be in the forwarding state, based on the test messages the determining device receives, and setting all the ports of the non-determining transmitting devices, permanently to the forwarding state.

Preferably, the non-determining transmitting devices include only a single port each. Preferably, the non-determining transmitting devices include end-stations. Further preferably, the non-determining transmitting devices do not run a software related to the loop prevention method. Preferably, transmitting test messages by the non-determining devices includes transmitting response requests to the non-determining devices from one or more of the determining devices and transmitting the test messages in response to the response requests by the non-determining devices.

Preferably, transmitting response requests includes transmitting ARP requests, more preferably ARP requests with unicast destination addresses. Alternatively, transmitting response requests includes transmitting ICMP echo messages. Preferably, transmitting response requests includes transmitting response requests with one or more special source addresses which do not belong to any of the devices.

Preferably, the method includes configuring the device transmitting the response requests with a IP address or MAC address of the non-determining device to which the response requests are transmitted. Alternatively or additionally, the method includes determining, by the device transmitting the response requests, of the IP address of the non-determining device to which the response requests are transmitted, from messages unrelated to the loop prevention method transmitted from the non-determining device. Preferably, the determining transmitting devices include bridging-devices. Preferably, the method includes moving at least one of the ports to an emulated blocking state in which test messages may be transmitted and received through the port but all messages received through the port are not forwarded through any other port of the device which includes the emulated blocking port.

Preferably, moving the at least one of the ports to the emulated blocking state includes tagging all messages received by the port as belonging to a VLAN to which none of the other ports of the device belong. Preferably, moving the at least one of the ports to the emulated blocking state includes moving to a state in which the emulated blocking ports transmit and receive only messages of a specific VLAN not in common with any of the other ports of the device to which the emulated blocking port belongs. Preferably, moving the at least one of the ports to an emulated blocking state includes moving ports which lead to non-determining devices.

There is further provided in accordance with a preferred embodiment of the invention, a device of a local area network, including at least one port through which the device sends test messages, used in determining the topology of the network, to one or more bridging-devices of the network, and a processor which runs an IP stack but does not run a software of any port blocking method.

There is further provided in accordance with a preferred embodiment of the invention, a method of blocking ports to prevent formation of active loops in a network, including determining topology information of the network, determining whether one or more specific ports of the network are currently active, and determining which port should be active, based on the determined topology information and based on whether the one or more specific ports of the network are currently active.

Preferably, determining the topology information includes transmitting test messages between devices of the network. Preferably, determining the topology information includes determining whether the transmitted test messages are received. Preferably, transmitting the test messages includes transmitting messages which include indication of the protocol state of one or more of the ports of the transmitting device.

Preferably, determining the topology information includes determining whether the links to which the one or more ports lead, are operative. In a preferred embodiment of the invention, determining the topology information includes receiving hardware indications on the operability the links to which the one or more ports lead.

Preferably, determining which port should be active includes determining that a first port should be active only if all the other ports leading to the same device as the first port are not currently active. Preferably, all the ports leading to the same device as the first port are ordered in a predetermined order and determining which port should be active includes determining that the first port should be active only if all the other ports higher than the first port in the predetermined order are not in a state indicating that the port is planning to be active. Preferably, determining whether the one or more specific ports of the network are currently active includes determining by a first device of the network whether at least one port of a second device of the network is active.

There is further provided in accordance with a preferred embodiment of the invention, a method of blocking ports to prevent formation of active loops in a network, including determining topology information of the network, determining one or more parameters of the network, blocking a first group of ports responsive to the determined one or more parameters of the network and responsive to the determined topology information, changing at least one of the one or more parameters of the network responsive to the blocking of the first group of ports, and determining whether to change the group of blocked ports responsive to the changed at least one of the one or more parameters.

Preferably, determining the topology information includes determining whether one or more links of the network are operative. Preferably, determining the one or more parameters of the network includes determining weights of one or more links of the network. Preferably, changing at least one of the one or more parameters of the network includes changing the weight of at least one of the links of the network. Preferably, changing the weight of the at least one of the links includes reducing the weight of at least one currently active link of the network.

Alternatively or additionally, determining the one or more parameters of the network includes determining an activating priority order of a plurality of ports of the network. Preferably, changing at least one of the one or more parameters of the network includes changing the position of at least one of the plurality of ports in the activating priority order. Preferably, changing the position of at least one of the plurality of ports in the activating priority order includes moving a currently active port to the top of the priority order.

Preferably, determining the one or more parameters of network includes transmitting test messages between devices of the network. Preferably, transmitting the test messages includes transmitting BPDUs. Preferably, determining the one or more parameters of the network includes accessing an internal storage of the determining device.

Preferably, changing at least one of the one or more parameters of the network includes reducing the number of possible operability changes which will change the group of blocked ports of the network by changing the at least one of the one or more parameters of the network.

Alternatively or additionally, changing at least one of the one or more parameters of the network includes preventing the group of blocked ports of the network from changing without a failure occurring on the connection of an active port by changing the at least one of the parameters.

There is further provided in accordance with a preferred embodiment of the invention, a method of blocking ports to prevent formation of active loops in a network, including blocking a first group of ports at a first time responsive to an operativeness state of the network, and blocking a second group of ports different from the first group of ports, at a second time, while the network is in the same operativeness state as caused the blocking of the first group of ports.

Preferably, the operativeness state of the network includes a state in which substantially all the elements of the network are operative. Preferably, the method includes blocking the second group of ports responsive to a different operativeness state of the network than caused the blocking of the first group of ports and blocking the second group of ports while the network is in the same operativeness state as caused the blocking of the first group of ports includes not changing the group of blocked ports although the operativeness state of the network changed from the different operativeness state to the same operativeness state as caused the blocking of the first group of ports.

Preferably, the method includes transmitting, from a plurality of bridging-devices of the network, test messages which include indication of the current state of the ports of the transmitting bridging-device and blocking the second group of ports includes blocking the second group of ports rather than the first group of ports responsive to the transmitted test messages. Preferably, the network includes a plurality of bridging-devices and at least some of the plurality of bridging-devices change the state of a port from forwarding to blocking only if the port is inoperative or suspected as being inoperative.

There is further provided in accordance with a preferred embodiment of the invention, a method of blocking ports to prevent formation of active loops in a network, including transmitting messages by at least one first bridging-device to at least one second bridging-device of the network, transmitting messages by the at least one second bridging-device to the at least one first bridging-device responsive to the messages from the at least one first bridging-device to the at least one second bridging-device, and determining which ports to block responsive to at least the messages transmitted by the at least one second-bridging device received by the at least one first bridging-device.

Preferably, transmitting messages by the at least one second bridging-device to the at least one first bridging-device includes transmitting messages which include acknowledgments of the messages from the at least one first bridging-device to the at least one second bridging-device. Preferably, transmitting messages from the at least one second bridging-device to the at least one first bridging-device includes transmitting spanning tree algorithm BPDUs. Preferably, transmitting messages from the at least one first bridging-device to the at least one second bridging-device includes transmitting messages between substantially each pair of directly linked bridging-devices in the network. Preferably, determining which ports to block includes determining which ports to block, responsive to whether the messages transmitted by the at least one second-bridging device are received. Preferably, determining which ports to block includes determining which ports to block, responsive to the contents of the messages received by the at least one first bridging-device.

There is further provided in accordance with a preferred embodiment of the invention, a device of a local area network, includes a processor, and at least one port which passes to the processor at least messages belonging to a plurality of different protocols and which does not forward any of the messages it receives through any other port of the device.

Preferably, the at least one port determines which messages are passed to the processor based on the destination address of the packets and the at least one port passes to the processor messages of a plurality of different destination addresses. Preferably, the at least one port passes to the processor messages of at least one address different from the standard STA BPDU address. Preferably, the at least one port does not forward messages received through any of the other ports of the device. Preferably, the at least one port does not match addresses to ports. Preferably, the at least one port tags all untagged messages received by the at least one port as belonging to a VLAN to which none of the other ports of the device belong.

BRIEF DESCRIPTION OF FIGURES

The invention will be more clearly understood by reference to the following description of preferred embodiments thereof in conjunction with the figures, in which.

DETAILED DESCRIPTION OF THE PREFERRED EMBODIMENTS

Figure 1:
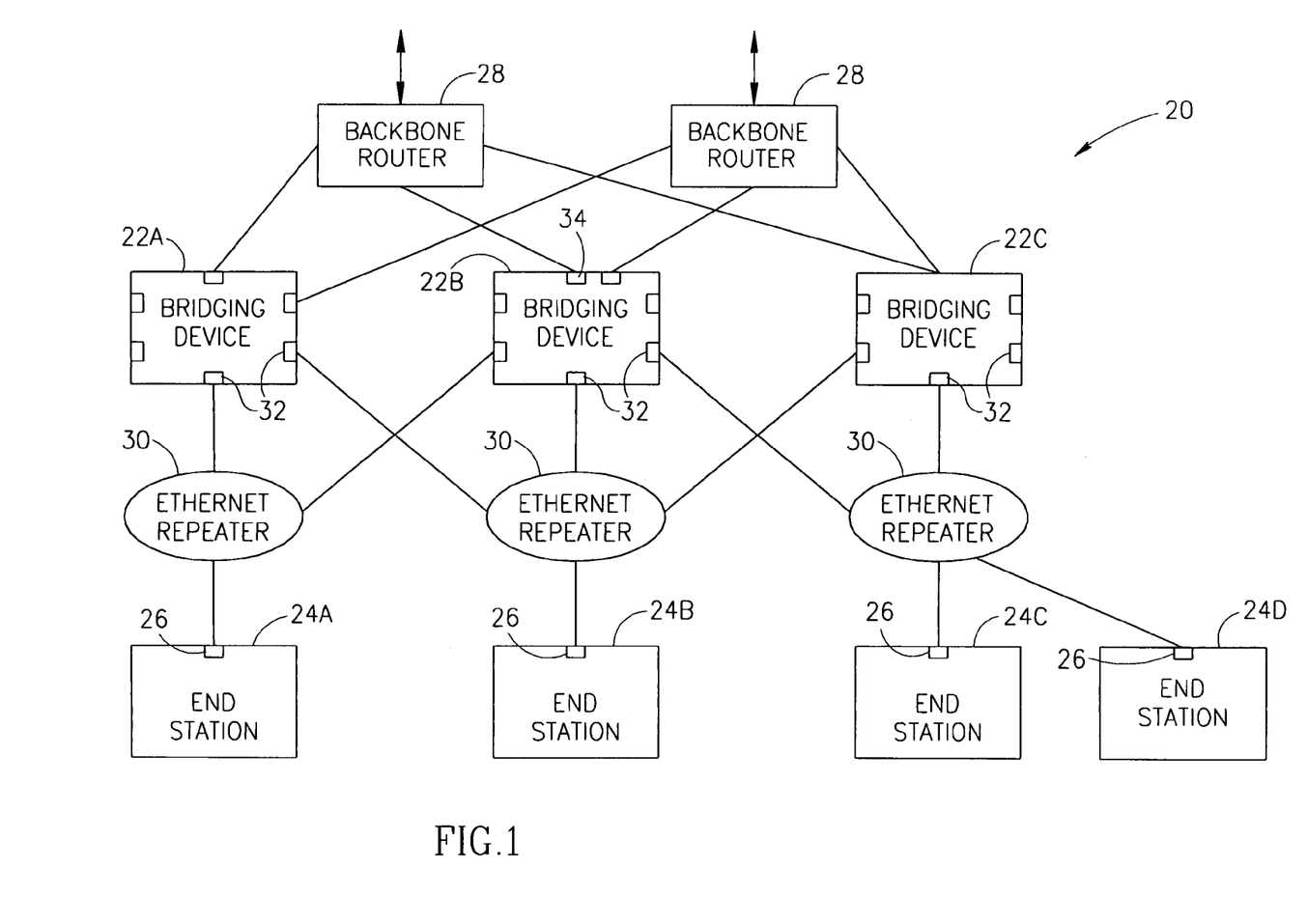
FIG. 1 is a schematic illustration of a local area network, in accordance with a preferred embodiment of the present invention.

FIG. 1 is a schematic illustration of a local area network 20, in accordance with a preferred embodiment of the present invention. Network 20 comprises a plurality of bridging-devices 22 which are used to connect a plurality of end-stations 24 (marked in FIG. 1 as 24A, 24B, 24C and 24D) to each other and/or to external networks, through one or more backbone bridging-devices and/or routers, such as a pair of backbone bridging-devices which are also routers, referred to as backbone routers 28 in FIG. 1. One or more of end stations 24 comprise only a single port 26 which is suitable for connecting to any of bridging-devices 22. Preferably, the ports 26 of end-stations 24 are connected through respective Ethernet repeaters 30 to a plurality of ports 32 on different bridging-devices 22. Thus, redundancy is achieved in connecting end-stations 24 to bridging-devices 22, even though each end-station 24 has only a single port 26. It is noted that one or more of repeaters 30 may be replaced by common links which connect three or more devices, such as Ethernet links.

A distributed blocking protocol, described hereinbelow, is preferably run separately for each end-station, e.g., 24A and 24B. Alternatively or additionally, a plurality of end-stations, e.g., 24C and 24D, are connected through a single repeater 30 to a plurality of bridging-devices 22 and a single instance of the distributed blocking protocol is run on each of the bridging-devices for the plurality of end-stations connected through the single repeater. For each of repeaters 30 a software implementing the protocol is preferably run on all the bridging-devices 22 to which the repeater is connected. In some preferred embodiments of the invention, a software implementing the distributed protocol is run also on one or more of the end-stations 24 connected to the repeater 30. In other preferred embodiments of the invention, end-stations 24 are passive participants in the protocol, as described hereinbelow. In these other embodiments, end-stations 24 do not transmit messages relating to the blocking protocol on their own initiative and do not determine which ports should be blocked. Furthermore, in these other embodiments the software of end-stations 24 is preferably not altered due to the protocol.

It is noted that the distributed blocking protocol makes a best effort to provide connection to and from the end-stations 24 at all times. In some cases such a connection may not be possible, and external intervening is required. Preferably, when a fault is detected in one or more of the elements of network 20 an alert is sent to a human system manager, in addition to the blocking and activating of ports of bridging-devices 22.

Figure 2:
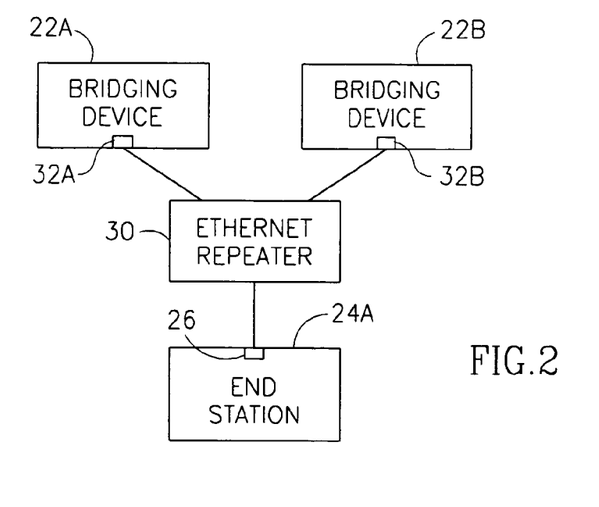
FIG. 2 is a schematic illustration of a portion of the network of FIG. 1, on which a single instance of a blocking protocol, in accordance with a preferred embodiment of the present invention, is run.

FIG. 2 is a schematic illustration of a portion of network 20 on which a single instance of the blocking protocol is run, in accordance with a preferred embodiment of the present invention. For clarity, the following description relates to end-station 24A and to bridging-devices 22A and 22B to which end-station 24A is connected. It is noted that the same bridging-devices 22A and 22B may run for others of their ports (which are connected to other end-stations 24), the same blocking protocol and/or other blocking protocols, including other distributed protocols.

Bridging-devices 22A and 22B periodically transmit test messages through their respective ports 32A and 32B, which ports lead to each other and to end-station 24A. In a preferred embodiment of the invention, the test messages are transmitted at equal time intervals at a rate of between about 2–50 messages each second. Preferably, at the same or a similar rate, end-station 24A also transmits test messages through its port 26.

In some preferred embodiments of the invention, the test messages of bridging-devices 22A and 22B, or separate messages, indicate whether the bridging-device transmitting the message has its port in a forwarding state. These messages are preferably used when communication with both bridging-devices 22A and 22B is operative, to determine which of the bridging-devices should activate its port 32.

Figure 3:
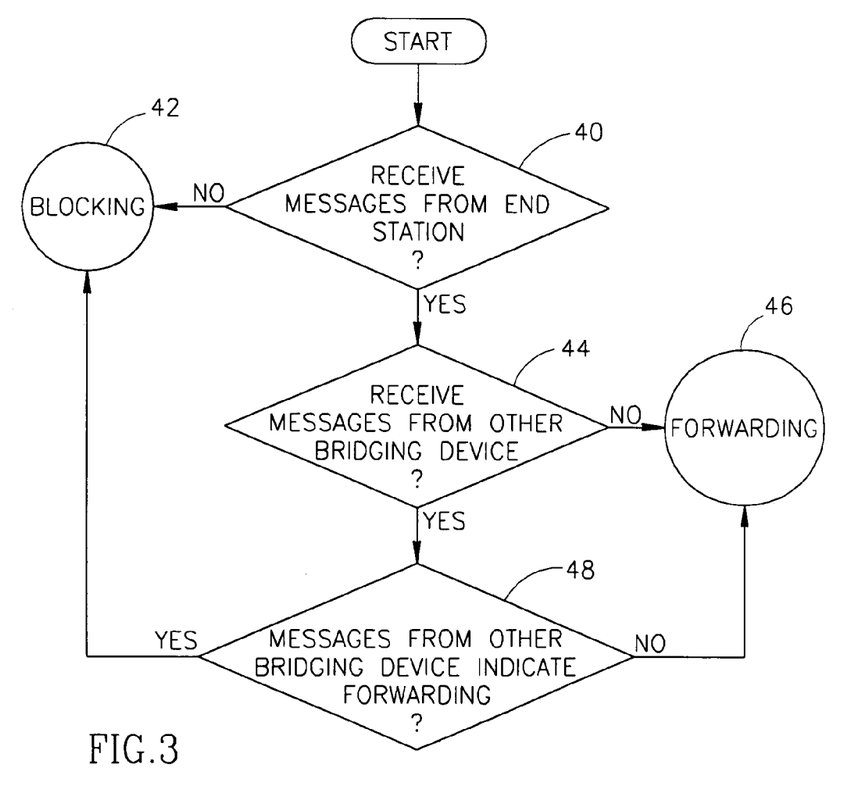
FIG. 3 is a simplified flowchart of the actions performed in a port blocking method, in accordance with a preferred embodiment of the present invention.

FIG. 3 is a simplified flowchart of the actions performed by bridging-devices 22A and 22B in performing a port blocking method, in accordance with a preferred embodiment of the present invention. The flowchart of FIG. 3 ignores a few timing issues for the simplicity of the explanation. These issues are explained in detail further hereinbelow with reference to FIG. 4. The bridging-device preferably constantly keeps track of the test messages it receives through its port 32. Periodically, for example between about 2–20 times a second, preferably every tenth of a second, the bridging-device checks whether (40) it received a sufficient number of the test messages from end-station 24A which were (or should have been) recently sent. If it did not receive the sufficient number of test messages from end-station 24A, the bridging-device moves to a blocking state (42) as it is not suitable for sustaining communication between network 20 and end-station 24A. If the bridging-device did receive the sufficient number of test messages from end-station 24A, the bridging-device checks (44) whether it received a sufficient number of the test messages from the other bridging-device. If the sufficient number of test messages were not received, it is concluded that the other bridging-device is inoperative and therefore the bridging-device moves its port to a forwarding state (46).

If the sufficient number of test messages were received from the other bridging-device as well as from the end-station, both the bridging-devices are operative. In this case one of the bridging-devices must block its port and the other bridging-device must have its port in forwarding state. In a preferred embodiment of the invention, the bridging-device checks (48) the contents of the test messages received from the other bridging-device to determine whether the other bridging-device already has its port in the forwarding state. If the other bridging-device already has its port in the forwarding state, the bridging-device moves to the blocking state. Otherwise, the bridging-device moves to (or remains in) the forwarding state. Alternatively, a predetermined one of the bridging-devices is selected, and whenever both the bridging-devices are operative, the predetermined selected bridging-device operates in the forwarding state and the other bridging-device operates in the blocking state. Further alternatively, the bridging-device currently in the forwarding state remains in the forwarding state and only if neither of the bridging-devices were in the forwarding state (e.g., the bridging-devices were just operated), the predetermined bridging-device moves to the forwarding state.

Alternatively to blocking port 32, as described above, any time test messages are not received from end-station 24A (40, 42), port 32 is unconditionally blocked when test messages are not received from both end-station 24A and from the other bridging-device 22. When test messages are received from the other bridging-device but not from end-station 24A, the bridging-device acts as if the test messages from end-station 24A are received (moving to 48). Thus, at all times one of ports 32 is forwarding, such that immediately when end-station 24A is operative it can transmit and receive messages without delay. In addition, in some preferred embodiments of the invention, it is desired to connect a plurality of end-stations 24 through a single Ethernet repeater 30 (as illustrated by end-stations 24C and 24D in FIG. 1). Preferably, in this embodiment test messages are sent only from a single one of the end-stations, e.g., end-station 24A. Thus, using the above described alternative which always keeps one port 32 forwarding, if end-station 24A is inoperative while the other end-station is still operative the communication with the operative end-station is not interrupted.

Alternatively, when a plurality of end-stations are connected through a single Ethernet repeater, end-stations 24 split between them the transmission of the test messages. For example, instead of a single end-station 24 transmitting messages at a rate of 10 per second, each one of two end-stations transmit messages at a rate of 5 per second alternately. Thus, even if one of the plurality of end-stations is inoperative, test messages are received by bridging-devices 22 from the other end-station.

Referring in more detail to transmitting the test messages from bridging-devices 22A and 22B, it is noted that in normal conditions, at least one of ports 32A and 32B is blocked and therefore a scheme is required to allow the test messages to pass through blocked ports. In a preferred embodiment of the invention, the test messages are transmitted with the destination address normally used for spanning tree algorithm (STA) BPDUs. Using the same destination address as used by STA BPDUs, allows entrance of the test messages through blocked ports using the standard software of bridging-devices.

Alternatively or additionally, the software of the bridging-devices is changed to define an emulated blocking state, in which test messages are allowed to enter through the port to the processor of the bridging-device while other frames received through port 32 are not forwarded through any of the ports of the bridging-device. In a preferred embodiment of the invention, the test messages are sent using the MAC destination addresses of the bridging-devices. Alternatively or additionally, the test messages are sent using special dedicated MAC addresses used substantially only for the test messages. Preferably, each of bridging-devices 22A and 22B is assigned a separate dedicated MAC address. Alternatively, a single dedicated MAC address is used for both of bridging-devices 22A and 22B.

In some preferred embodiments of the invention, the test messages have a special message format used substantially only for the test messages. Alternatively, the test messages have a known format, such as an ARP query format or a ping format.

Referring in more detail to transmitting the test messages from end-station 24A, in a preferred embodiment of the invention, the end-station transmits the test messages based on an internal timing within it. In some preferred embodiments of the invention, the test messages from end-station 24A are sent with the MAC address of STA BPDUs or a dedicated address as described above with relation to the test messages from bridging-devices 22.

Alternatively, in order to avoid changing the software of end-station 24A, the transmission of test messages by end-station 24A is performed using a polling method. That is, bridging-devices 22A and 22B periodically, at a desired rate, send response requests to end-station 24A and the end-station sends its test messages responsive to the response requests. In a preferred embodiment of the invention, bridging-devices 22A and 22B send response requests at the rate they send their test messages, such that each of bridging-devices 22A and 22B receives from end-station 24A response messages directed to it at the rate it receives test messages from the other bridging-device. In this embodiment, however, end-station 24 sends test messages (response messages) at twice the rate bridging-devices 22A and 22B send test messages. Alternatively, bridging-devices 22A and 22B send the response requests at about half the rate at which they send test messages, so that end-station 24A sends test messages at the same rate as bridging-devices 22. Further alternatively, only one of the bridging-devices sends response requests and the other bridging-device sends response requests only if it does not receive test messages from end-station 24A.

In a preferred embodiment of the invention, a system manager configures the bridging-devices with the. MAC address and the IP address of the end-stations 24 for which the bridging-devices run the port blocking method. Alternatively, the system manager configures the bridging-devices with the IP address of the end-stations 24, and the bridging-devices determine the respective MAC addresses of the configured IP addresses using standard ARP methods. The determination of the MAC address is preferably performed when the bridging-device is activated and/or when the communication between one or more of the end-stations and the bridging-device is disconnected for a long time. The determination of the MAC address after a long disconnection is performed in order to check whether the MAC address of the end-station 24 with which there was no connection for a long time, has changed. Further alternatively, the bridging-devices determine both the IP address and the MAC address of end-stations 24 from the data frames which the end-station creates and transmits.

It is noted that in many cases it is desirable to allow a user to connect an end-station 24A to network 20 without needing to change the software of the end-station. In addition, the software of end-station 24A may be complicated or inaccessible for changes, as it is not always produced by the same manufacturer as bridging-devices 22.

In a preferred embodiment of the invention, the response requests of the above described polling method comprise ping messages, i.e., Internet control message protocol (ICMP) echo messages. Alternatively or additionally, the response requests comprise address resolution protocol (ARP) queries. Preferably, in either of these alternatives, when the ports of the bridging-devices are supposed to be blocked they are set to an emulated blocking state, which allows the response requests and the responses to be transmitted and received through the blocked port.

In a preferred embodiment of the present invention, the response requests are sent with the unicast address of end-station 24A as their destination address, so that the response requests do not propagate through the network unnecessarily. Preferably, all of the bridging-devices 22 connected through repeater 30 to end-station 24A recognize the address of end-station 24A, such that the bridging-device 22 which has its port in the forwarding state will not forward the response requests throughout the network as if they are unknown unicast messages.

In a preferred embodiment of the present invention, bridging-devices 22 use a special dedicated address, different from the regular addresses of the bridging-devices, to identify themselves in their port-blocking related communication with end-station 24A. In embodiments in which the test messages sent between bridging-devices 22 use special dedicated addresses, these addresses may be the same or different than the addresses used for the communication with end-station 24A. The special dedicated address is preferably used as the source address of the response requests sent to end-station 24A such that the consequent request responses (i.e., the test messages sent by end-station 24A) are sent to the special dedicated address. The use of the dedicated addresses allows differentiation between test messages related to the port-blocking method and other messages sent to a bridging-device 22.

In a preferred embodiment of the present invention in which each repeater 30 is connected to two bridging-devices 22, two dedicated addresses are used for the communication with end-stations 24, throughout network 20. Preferably, the two dedicated addresses are used for each repeater 30 to differentiate between the bridging-devices connected to the same repeater. Preferably, when more than two bridging-devices 22 are connected to a single repeater 30, each bridging-device is assigned a separate dedicated address. It is noted that a single bridging-device 22 may be assigned different dedicated addresses for the different reporters to which it is connected.

Referring in more detail to checking whether test messages are received from the other bridging-device 22 and/or from end-station 24A (40 and/or 44), in a preferred embodiment of the invention, the bridging-device checks whether the sufficient number of test messages are received during a predetermined period. In a preferred embodiment of the invention, the predetermined period has a length of between about 0.2–0.8 seconds, most preferably about 0.5, seconds. Alternatively, the predetermined period is of the length of time between two consecutive times in which the bridging-device checks whether it received a sufficient number of the test messages. In a preferred embodiment of the present invention, the sufficient number of messages comprises one message, such that if a single message is received the connection is considered operative. Alternatively, the sufficient number of messages comprises all the transmitted messages. Further alternatively, the sufficient number of messages comprises a certain percentage of the transmitted messages, such as 50% or 75% of the transmitted messages. In some preferred embodiments of the present invention, different percentages of required received messages are defined for different connections, e.g., the connection between bridging-device 22 and end-station 24A versus the connection between bridging-devices 22.

As described above, in a preferred embodiment of the invention, a plurality of end-stations 24 are connected to bridging-devices 22 through a single Ethernet repeater 30, and the test messages are sent alternately by the plurality of end-stations. Preferably, in this embodiment, the test messages from end-stations 24 are considered received if a sufficient percentage of all the expected transmitted messages, are received. Alternatively, the test messages are considered received properly, if a sufficient percentage of all the test messages expected to have been transmitted from all the end-stations connected through the repeater 30, are received.

In a preferred embodiment of the invention, bridging-devices 22A and 22B include acknowledgment indications of the test messages they received in the test messages they transmit. Alternatively, bridging-devices 22A and 22B transmit separate acknowledgment messages responsive to the test messages they receive. Preferably, a link is considered operative only if a sufficient percentage of acknowledgment messages are received in addition to the test messages. In a preferred embodiment of the present invention, a single acknowledgment message is sufficient even if more than one test messages are required for a link to be considered operative. Alternatively, each received test message must have a respective acknowledgment message (included within or received separately) in order for the link to be considered operative. Thus, if a link is inoperative in one direction it will be considered inoperative as the acknowledgment messages will not be received. Alternatively, the test messages are transmitted by bridging-devices 22A and 22B responsive to response requests generated by the other of the bridging-devices.

Preferably, the response messages generated by end-station 24A identify the bridging-device 22 which sent the response request that initiated the generation of the response message. Preferably, the messages identify the initiating bridging-device by stating one of the plurality of dedicated addresses which differentiate between the bridging-devices connected to a single repeater 30. Alternatively, the messages use a destination MAC address unique to the initiating bridging-device. Preferably, a bridging-device considers the connection with end-station 24A operative, only if response messages generated responsive to the response requests of the bridging-device, are received. Thus, the bridging-device knows that the communication with end-station 24A is operative in both directions.

In a preferred embodiment of the invention, the response requests transmitted by bridging-devices 22 to end-station 24A and the test messages transmitted by bridging-devices 22 are included in a single common message. Preferably, the common message is transmitted using the STA BPDU destination address, such that the common message does not propagate throughout the network.

Referring in more detail to the step of moving to the forwarding state (46), preferably the bridging-device waits a short period before moving its port 32 into the forwarding state. The short period is preferably a sufficient time for the other bridging-device to block its port 32. This is performed in order to make sure that one bridging-device will not move its port 32 to the forwarding state while the other bridging-device has its port 32 in the forwarding state.

As described above, a port in the emulated blocking state preferably allows test messages to be transmitted and received through the port, but messages received through the port are not forwarded through any of the other ports of the bridging-device containing the emulated blocking port. In addition the emulated blocking port preferably does not forward messages received by any of the other ports of the bridging-device containing the emulated blocking port.

In a preferred embodiment of the invention, the emulated blocking port is created by tagging all the untagged (i.e., not marked as belonging to a VLAN) frames received through the emulated blocking port as belonging to a predefined VLAN which is not supported by any of the other ports of the bridging-device. In a preferred embodiment of the invention, the tagging comprises internal tagging which is used only by the tagging bridging-device. Alternatively, the tagging comprises external tagging which takes effect also outside of the bridging-device if the message exits the bridging-device.

Preferably, if the bridging-device has a plurality of emulated blocking ports, each of the ports tags the frames it receives as belonging to a different VLAN. Messages which are already tagged as belonging to a specific VLAN are preferably received by the port only if they are tagged with the VLAN of the port. Thus, frames received by the emulated blocking port are not forwarded through any other port.

In addition, the emulated blocking port is preferably configured to forward out of the bridging-device only messages tagged as belonging to the predefined VLAN, such that substantially all messages received by any of the other ports of the bridging-device are not forwarded through the emulated blocking port.

Alternatively or additionally, the test messages (including response request frames and the responses to the response requests) directed to the emulated blocking port are tagged as belonging to the VLAN of the port. Preferably, the port transmits and/or receives only frames of the defined VLAN.

In a preferred embodiment of the invention, the emulated blocking port is configured to pass to the processor of the bridging-device only received frames which carry test messages. Preferably, the frames carrying test messages are identified based on their destination address which is, as described above, either the MAC address of the bridging-device or a dedicated unicast address defined specifically for the test messages, or by some other identification within the frames. Specifically, the emulated blocking port is preferably configured not to pass multicast, broadcast and/or unknown unicast messages to the processor. By preventing the frames reaching the emulated blocking port from being passed to the processor, the load on the processor of the bridging-device is kept substantially at the level as it would be if the port was in a real blocking state.

Referring back to FIG. 1, it is noted that some frames, e.g., broadcast frames, sent to and from end-station 24A may be received by bridging-device 22B twice. Assuming, without loss of generality, that the port 32 of bridging-device 22B leading to end-station 24A is currently blocked, the frames are received once through a port 34 connected to one of backbone routers 28 which received the frame from bridging-device 22A which in turn has a forwarding port 32 connected to the repeater 30 leading to end-station 24A. The same frame is also received through Ethernet repeater 30 and the emulated blocking port 32. Therefore, in bridging-devices 22 which learn a single port for each address, the bridging-device will alternately learn that the end-station transmitting the frames is behind the blocking and active ports. Such learning will confuse bridging-device 22 and will slow down the operation of network 20. In bridging-devices which perform MAC-address-to-port mapping for each VLAN separately, the bridging-device will learn a plurality of ports for each MAC address in messages the bridging-device receives. One learned port will be the correct port and the rest will be one or more emulated blocking ports. If there are many devices connected through repeaters and many devices with addresses in the network, the memory of the bridging-device may be exhausted and messages received by the emulated blocking ports may initiate learning of unnecessary mappings which will overwrite necessary mappings from forwarding ports.

Therefore, in a preferred embodiment of the invention, the bridging-device is configured not to perform automatic MAC-address-to-port mapping based on frames received through the emulated blocking port. It is noted that in some preferred embodiments of the invention it is not possible to configure the bridging-device not to perform MAC-address-to-port mapping for a single port 32. Preferably, in these embodiments the bridging-device is configured not to perform automatic MAC-address-to-port mapping for a group of ports to which ports 32 belong. Preferably, instead of performing the automatic MAC-address-to-port mapping, the bridging-device periodically sends ARP messages to the end-stations 24 to which it is connected to determine through which port they are connected. Preferably, the ARP messages are transmitted between about every 10–20 seconds. Further preferably, those devices to which ARP messages are sent as test messages, as described above, are not sent additional ARP messages for performing MAC-address-to-port mapping and rather the information from the test messages is used. Preferably, only end-stations 24 for which the port blocking method of the present invention is performed, are connected to the group of ports of bridging-device 22 which includes ports 32.

It is noted that in some preferred embodiments of the present invention, network 20 provides services for one or more virtual servers. The virtual server is assigned an IP address and/or a MAC address which are used in the messages sent to the virtual server. Messages directed to the virtual server are passed to one of end-stations 24 currently assigned to handle the messages to the virtual server. The assigned end-station of the virtual server at any specific time is preferably chosen by end-stations 24 according to the operativeness state of end-stations 24. Preferably, the port mapping of the addresses of the virtual server is performed by periodically polling the ports behind which the virtual server may be, to find out where the server is currently located (i.e., which end-station is handling messages addressed to the virtual server). Alternatively or additionally, the end-station 24 practicing for the virtual server periodically sends messages to bridging-devices 22 notifying them that it is currently practicing for the virtual server, such that the bridging-devices 22 can easily perform the port mapping for the virtual server. Further alternatively or additionally, when an end-station begins to practice for the virtual server it immediately sends one or more messages to bridging-devices 22 notifying them that it is currently practicing for the virtual server. The port learning is thus performed immediately upon a change in the identity of the end-station 24 practicing for the virtual server.

Alternatively to disabling the automatic MAC-address-to-port mapping, the processor of the bridging-device is notified each time one of the ports performs learning for an address. If the learned port seems correct to the processor, i.e., it is not an emulated blocking port, the processor changes the learned entry to a static state which does not allow learning for that MAC address any more. When a change in the topology of the network occurs, the bridging-device preferably releases all the entries from the static state to allow learning responsive to the new topology.

Figure 4:
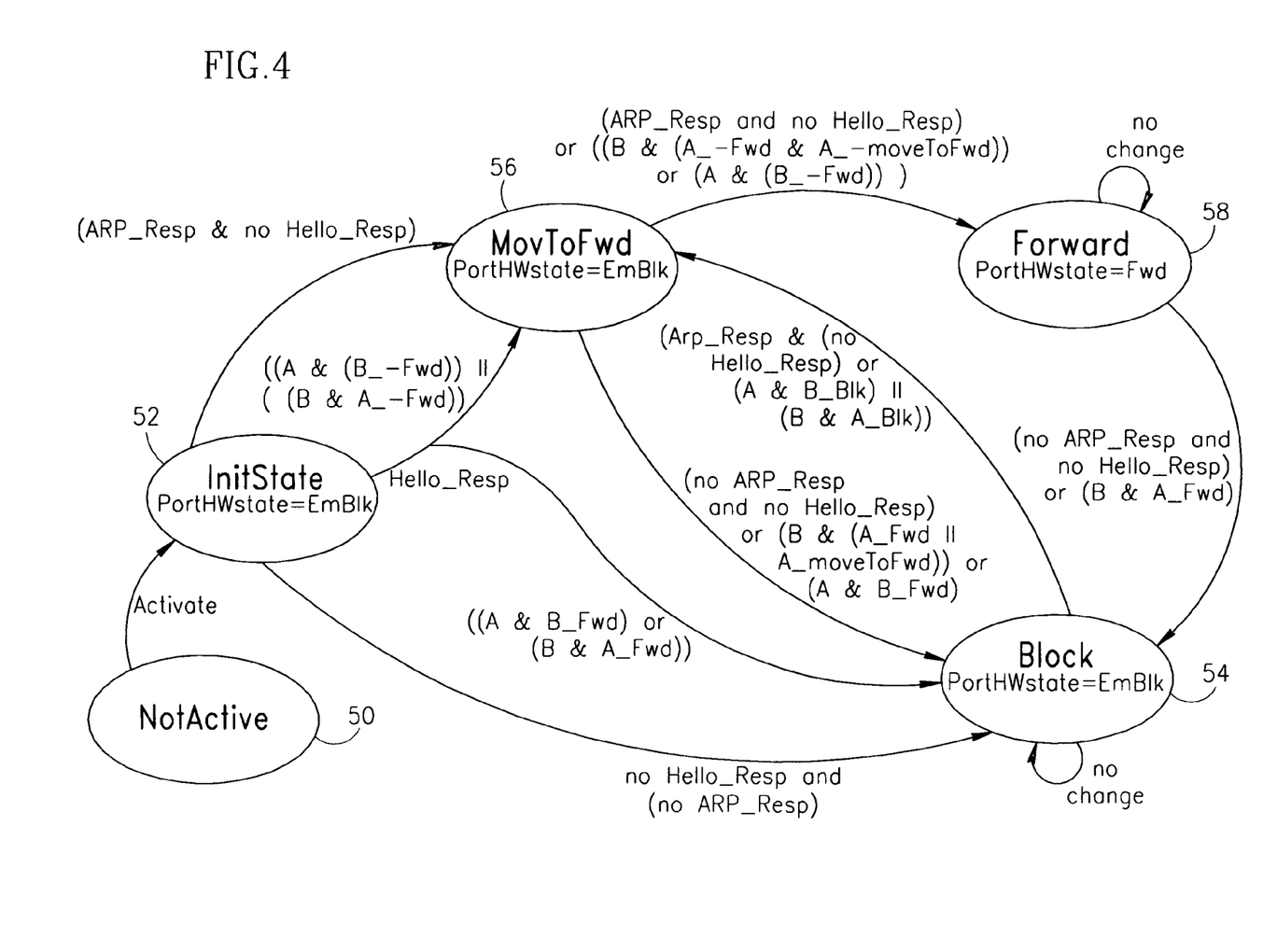
FIG. 4 is a sciatic state diagram of the operation of bridging-devices carrying out a port blocking method, in accordance with a preferred embodiment of the invention.

FIG. 4 is a schematic state diagram of the operation of bridging-devices 22A and 22B, in accordance with a preferred embodiment of the present invention. When any of bridging-devices 22A and 22B is activated, the bridging-device moves from an inactive state (50) to an initialization state "InitState" (52). In the InitState, port 32 (FIG. 2) of the bridging-device is kept in the emulated blocking state. In all states except the inactive state (50), test messages are transmitted as described hereinabove with reference to FIG. 3. The test messages transmitted by bridging-devices 22A and 22B preferably include an indication of the current state of the port 32 of the transmitting bridging-device.

Preferably, all state transitions in FIG. 4 which occur when test messages are not received from the other bridging-device, are performed only after messages are not received for a predetermined interval. This interval is required in order to make sure that state movement is not due to a single lost packet, but rather is due to a real fault. In a preferred embodiment of the invention, the predetermined interval is between about 0.2–0.8 seconds, preferably 0.5 seconds. State transitions which occur when test messages are received from the other bridging-device 22 preferably occur immediately as the state of the other bridging-device is known from the received test messages. Alternatively, substantially all the transitions are performed only after examining messages (received or not received) during the predetermined interval.

If the response messages from end-station 24A (referred to in FIG. 4 as ARP_resp) are not received and the test messages from the other bridging-device 22 (referred to in FIG. 4 as Hello_resp) are not received for at least the predetermined interval, the bridging-device moves to a blocking (Block) state (54). If the response messages from end-station 24A are received and the test messages from the other bridging-device 22 are not received for at least the predetermined interval, the bridging-device moves to a MovToFwd state (56) in which the bridging-device prepares itself to move to a Forward state (58). In the MovToFwd state (56) the port 32 of the bridging-device is, however, still blocked so that a case in which both ports 32A and 32B are forwarding never occurs. A bridging-device 22A or 22B moves to the Forward state (58) only after it is determined (either directly from the test messages of the other bridging-device or indirectly, as described in detail further hereinbelow) that the other bridging-device is not moving to the Forward state (58). If in the InitState (52), test messages are received from the other bridging-device, regardless of whether response messages are received from end-station 24A, the state to which the bridging-device moves is determined based on the state advertised by the other bridging-device in the test messages it sends. If the other bridging-device advertises it is not in Forward state (58), e.g., the current bridging-device is A and the other bridging-device B is not in the forward state (B~fwd), the current bridging-device moves to MovToFwd state (56). If the other bridging-device advertises that it is in the forward state the current bridging-device moves to blocking state (54).

Preferably, one of the bridging-devices (22A in FIG. 4) is defined as a dominant bridging-device which moves its port 32A (FIG. 2) to forwarding when the operation status of both the bridging-devices is equal (e.g., both the bridging-devices operate properly) and neither of the bridging-devices is already in the forwarding state (e.g., the bridging-devices were just switched on).

A bridging-device moves (after the predetermined interval) from MovToFwd state (56) to Forward state (58) if test messages are not received from the other bridging-device, which means the other bridging-device realizes it is inoperative and moves to the blocking state. In a preferred embodiment, the bridging-device moves to Forward state (58) only if it receives test messages from end-station 24A. Alternatively, if all other conditions are fulfilled a bridging-device may move to Forward state (58) even if it does not receive test messages from end-station 24A. In addition, if the current bridging-device is dominant it moves its port 32 to Forward state (58), if the other bridging-device is not advertising it is in the Forward state, even if it advertises it is in the MovToFwd state (56). If the current bridging-device is not the dominant bridging-device it moves to the forwarding state only if the other bridging-device does not advertise that it is in the forwarding state or in the MovToFwd state.

Preferably, a bridging-device must wait in the MovToFwd state (56) for a minimal amount of time, e.g., half a second, before it moves to Forward state (58) to prevent both of bridging-devices 22 from moving together into the forwarding state.

A bridging-device in MovToFwd state (56) which receives test messages from the other bridging-device stating that the other bridging-device is in the Forward state, or is dominant and is in the MovToFwd state (56), moves to blocking state (54). In addition, a bridging-device which is in MovToFwd state (56) or Forward state (58) and does not receive test messages both from the other bridging-device and from end-station 24A moves to blocking state (54), after the predetermined interval, as the bridging-device must have been disconnected.

Preferably, if the non-dominant bridging-device is in Forward state (58) and receives a message from the dominant bridging-device that it is in the Fforward state (58), the non-dominant bridging-device moves to blocking state (54). It is noted that this situation should never occur and is defined only as a precaution.

A bridging-device moves from blocking state (54) to MovToFwd state (56), if it receives test messages from end-station 24A but not from the other bridging-device or if it receives test messages stating that the other bridging-device is in blocking state (54).

Referring back to FIG. 1, in a preferred embodiment of the invention, bridging-devices 22 and backbone routers 28 also transmit to each other test messages used to determine which of the ports leading to backbone routers 28 should be blocked in each of bridging-devices 22. At any time each bridging-device 22 preferably has only a single active port leading to a backbone router 28. Preferably, the active port is chosen from those ports through which test messages indicating that the connection with the backbone router 28 on the other side of the port, is operative. Preferably, the test messages include acknowledgment messages, as described hereinabove, such that the operativeness determination is a two-way determination. Preferably, the active port is chosen as the operative port which is highest in a predetermined order of the ports. In a preferred embodiment of the invention, when a port becomes active it is moved to the top of the predetermined order. Alternatively, an active port is not blocked unless it becomes inoperative, even if a port higher than the active port in the predetermined order becomes active.

Alternatively, a spanning tree algorithm (STA), such as the 802.1D standard STA is run on bridging-devices 22 and on backbone routers 28 to prevent formation of loops within network 20.

In some preferred embodiments of the present invention, an end-station 24 is connected to more than two bridging-devices 22. Preferably, the bridging-devices are organized in a predetermined order. In a preferred embodiment of the present invention, the predetermined order is chosen arbitrarily. Alternatively, the predetermined order is chosen according to the robustness of the bridging-devices, such that bridging-devices which are less likely to fail are higher in the predetermined order. A bridging-device moves its port to the forwarding state if it does not receive test messages from all the bridging-devices higher than it in the predetermined order. In a preferred embodiment of the present invention, a bridging-device which is not highest in the predetermined order, which sets its port 32 to the forwarding state advertises in its test messages or in separate messages that it is currently forwarding. In some preferred embodiments of the invention, a bridging-device does not move to forwarding even if it is highest in the predetermined order if it receives messages from another bridging-device which advertise that it is currently in the forwarding state.

Preferably, when there are more than two bridging-devices 22 connected to a single end-station 24, the bridging-devices send test messages which include a list of all the bridging-devices from which test messages were recently received. Alternatively, test messages are transmitted between each pair of bridging-devices irrespective of the other bridging-devices.

It is noted that the present invention is not limited to use with end-stations 24 which include only a single port 26 (FIG. 1). Rather, the present invention may be used also with end-stations with a plurality of ports 26, for example when it is not feasible or desired to change the software of the end-station.

Figure 5:
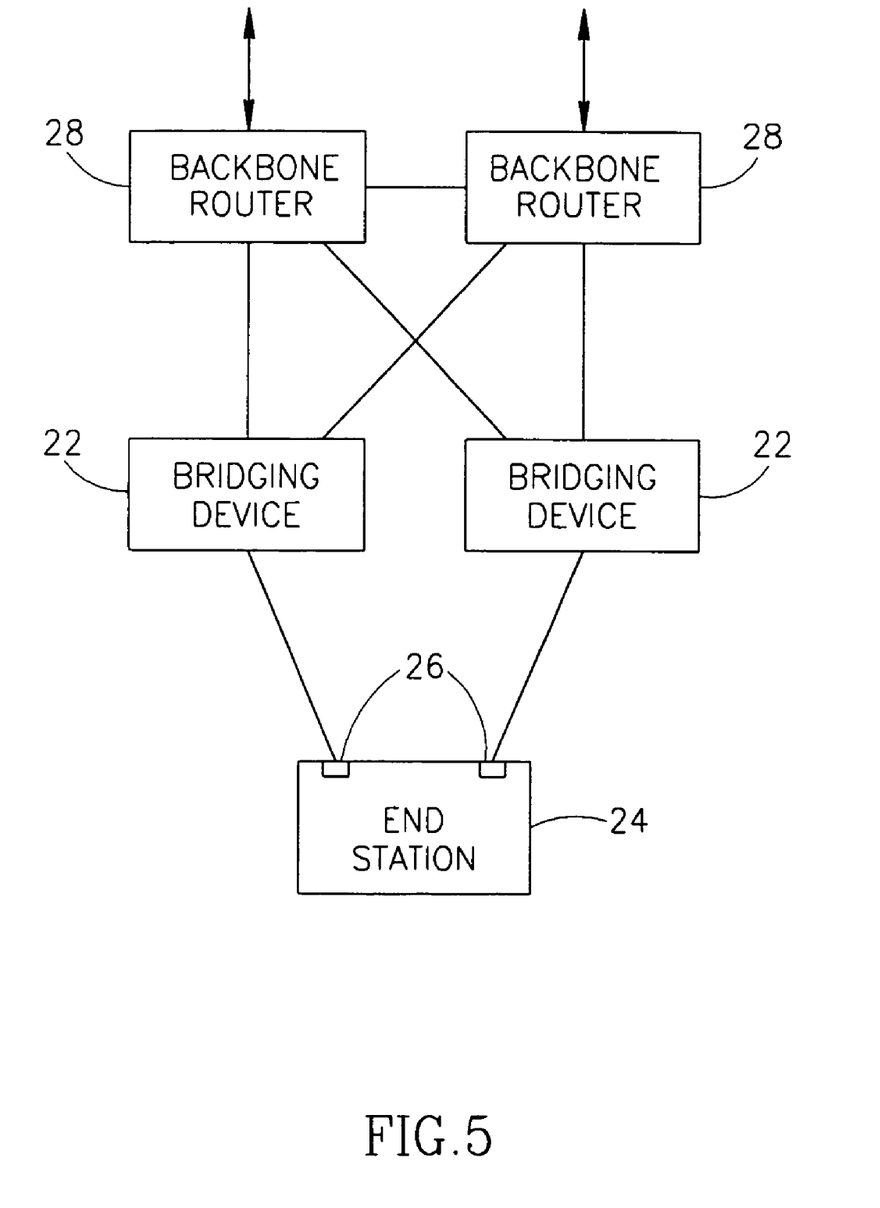
FIG. 5 is a schematic illustration of a local area network, in accordance with another preferred embodiment of the present invention.

FIG. 5 is a schematic block diagram of a network with an end-station which has a plurality of ports connected for redundancy to a plurality of bridging-devices 22, in accordance with a preferred embodiment of the present invention. End-station 24 is connected to a plurality of bridging-devices 22 through a plurality of respective ports 26. End-station 24, however, does not block any of ports 26 and the blocking is performed by bridging-devices 22, substantially as described hereinabove. The blocking is preferably performed in order to prevent end-station 24 from receiving broadcast messages a plurality of times, i.e., through each of its ports. Preferably, end-station 24 knows which of its ports leads to a forwarding state, such that messages whose transmission is initiated by the end-station are transmitted through a port which leads to a forwarding port of a bridging-device 22. Alternatively, end-station 24 transmits messages it initiates through all its ports.

Preferably, each bridging-device sends to the end-station separate response requests through its respective port 26, and accordingly receives test messages (response requests) from end-station 24. In addition, each bridging-device 22 sends the other bridging-device 22 test messages which arrive at the other bridging-device through one a plurality of backbone routers 28. The determination of which port is to be blocked and which is to be forwarding is preferably performed as described above with relation to FIGS. 3 and 4. It is noted, however, that unlike the embodiment described with relation to FIG. 2, the receiving of test messages from end-station 24 by a bridging-device is only indicative of the operation of the link connecting the bridging-device and end-station 24 and not of the connections between end-station 24 and other bridging-devices. Preferably, the connection between bridging-devices 22 is robust, e.g., includes sufficient redundancy, such that when messages are not received by one of the bridging-devices from the other bridging-device it may be assumed that the other bridging-device is inoperative.

In some preferred embodiments of the present invention, a spanning tree algorithm (STA) method which involves transmitting Bridge Protocol data Units (BPDUs) to neighboring bridging-devices, i.e., bridging-devices connected to each other through a single link, is modified to verify that all the links in the chosen tree allow two way communication. Such STA methods include, for example, the standard 802.1D STA, the STAs described in the above mentioned documents by M. Seaman, and the STA described in patent application Ser. No. 09/061,484 to Lior Shabtay, titled "Apparatus and method for Managing Communication Networks". In a preferred embodiment of the invention, BPDUs being sent to a bridgin device from which a BPDU was received, are sent with acknowledgment of reception of the BPDU. Preferably, in determining the spanning tree, only BPDUs which include acknowledgments are taken into account.

Alternatively, BPDUs are transmitted only responsive to BPDU requests. Each bridging-device which desires to receive BPDUs sends BPDU requests to its neighbors from which it wants to receive BPDUs. Thus, all the BPDUs a bridging-device receives are indicative of two way communication between the bridging-device and the neighbors from which the BPDUs are received.

It is noted that similar variations may be performed in any port-blocking protocol which uses transmission of test messages to check the operability of links. Such test messages may contain information, such as information on the topology of the network, as carried by standard STA BPDUs, and/or one or more network parameters (e.g., weights of links of the network, an order of priority in activating ports). Alternatively, the test messages may serve solely for determining whether the link is operative and carry no information.

In some preferred embodiments of the present invention, STAs which are based on link weights, lower the link weights of links which are currently forwarding. Thus, when a link which was forwarding and was blocked because it became inoperative becomes operative again it does not necessarily move back to the forwarding state. Preventing the link from becoming forwarding again reduces the number of transitions in the spanning tree of the network, which transitions may interrupt the operation of the network.

In a preferred embodiment of the present invention, the extent to which the weights of the links are lowered reflects a tradeoff between the desire to prevent unnecessary transitions and the desire to prevent permanent use of slow and/or expensive backup links. In a first exemplary embodiment, the weights are reduced only by a marginal amount to prevent transitions only between routes of substantially equal conditions. In a second exemplary embodiment, the weights are reduced substantially to a lowest allowed value to prevent transitions at substantially any cost.

Preferably, the change of the weights of the links is performed by transmitting a message to all the bridging-devices connected to the link (it is noted that more than two bridging-devices may connect through a single link) stating the new weight of the link. Preferably, the message is transmitted from a bridging-device which activates its port to the link, knowing that other ports to the link are activated, i.e., a bridging-device which activates a port which was chosen as a root port.

In a preferred embodiment of the present invention, when the link is blocked the weight of the link is moved back up to its original weight. Alternatively or additionally, the weights of links which fail are raised beyond their original weights according to the number of times they failed under the assumption that the cost of using links which commonly fail is high.

Another method which prevents unnecessary transitions involves creating a spanning tree by having each bridging-device begin at start-up as a separate cluster and having the clusters attempt to combine to each other. Each bridging-device of a cluster preferably keeps track of the topology of the entire cluster. If there exist operative links to bridging-devices outside of a cluster, the bridging-devices of the cluster search for the shortest (lowest cost) path to an external cluster, and the clusters combine by activating the link which connects them and exchanging topology information. This method, in some embodiments, does not attempt to reduce the cost of the spanning tree within a cluster, once a spanning tree is chosen and activated. Therefore, absent a failure of an active link, in these embodiments, the method does not change the group of blocked ports. This method is described in detail in the above mentioned Ser. No. 09/061,484 U.S. patent application.

It is noted that the term bridging-device is not limited to any specific bridging-device but rather includes switches, switch modules, bridges, and any other entity which performs data transfer at layer 2 (data link layer) of the OSI model. The bridging-devices are preferably implemented partially in hardware although also bridging-devices implemented entirely in software are within the scope of the present invention. In addition, the term bridging-device includes devices which perform tasks belonging to more than one layer of the OSI model. Such devices may belong primarily to layers other than layer 2 of the OSI model, and perform bridging between their ports in addition to their primary functions (e.g., routers of layer 3). In addition, such devices may be directed equally to tasks of more than one layer (e.g., layer 3 switches).

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

What is claimed is:

1. A method of managing connectivity between an end-device and one of a plurality of bridging-devices connected to the end-device, comprising:
   transmitting test messages by each of the bridging-devices;
   transmitting test messages by the end-device;
   determining, in each of the bridging-devices, with which of the other devices there is an operative connection, based on the test messages the bridging-device receives; and
   determining, in each of the bridging devices, whether a port leading to the end-device should be in a forwarding or blocking state responsive to the determination of the operative connections;
   wherein the bridging-devices are organized in a predetermined order and wherein determining whether the port should be in the forwarding or the blocking state comprises choosing the forwarding state if the connection with all the bridging-devices higher in the predetermined order are considered inoperative.

2. A method according to claim 1, wherein the bridging-devices and end-devices are connected through a common Ethernet repeater.

3. A method according claim 2, wherein at least one additional end-device is connected to the bridging-devices through the common Ethernet repeater.

4. A method according to claim 3, wherein the at least one additional end-device transmits test messages.

5. A method according to claim 3, wherein the at least one additional end-device does not transmit test messages.

6. A method according to claim 1, wherein the end-device is connected to the bridging-devices through a single port of the end-device.

7. A method according to claim 1, wherein transmitting the test messages by the end-device comprises transmitting said messages in response to response requests from at least one of the bridging-devices.

8. A method according to claim 7, wherein transmitting the test messages by the end-device comprises transmitting address resolution protocol (ARP) messages.

9. A method according to claim 8, wherein transmitting the ARP requests by the end-device comprises transmitting in response to unicast ARP requests.

10. A method according to claim 7, wherein transmitting the test messages by the end-device comprises transmitting Internet Control Message Protocol (ICMP) echo messages.

11. A method according to claim 1, wherein transmitting the test messages by the bridging-devices comprises transmitting messages with Bridge Protocol Data Units (BPDU) destination addresses.

12. A method according to claim 1, wherein transmitting the test messages by the end-device comprises transmitting messages with Bridge Protocol Data Units (BPDU) destination addresses.

13. A method according to claim 1, wherein transmitting the test messages by the bridging-devices comprises transmitting ARP messages or ICMP messages.

14. A method according to claim 1, wherein transmitting the test messages by the bridging-devices comprises transmitting messages which include acknowledgments of test messages recently received from other bridging-devices.

15. A method according to claim 1, wherein transmitting the test messages by the bridging-devices comprises transmitting messages which include an indication of the protocol state of the port toward the end-device of the transmitting bridging-device.

16. A method according to claim 15, wherein transmitting messages which include an indication of the protocol state of the port comprises transmitting messages which include indication on whether the port is blocking, "moving to forward" or forwarding.

17. A method according to claim 1, wherein determining with which of the other devices there is an operative connection, based on the test messages the bridging-device receives comprises making said determination based on whether the messages are received.

18. A method according to claim 1, wherein determining with which of the other devices there is an operative connection, based on the test messages the bridging-device receives comprises making said determination based on the contents of the received messages.

19. A method according to claim 1, wherein determining with which of the devices there is an operative connection comprises considering a device as having an operative connection only if at least one of the test messages received from the other device over a predetermined period include acknowledgments of receiving test messages from the determining bridging-device.

20. A method according to claim 1, wherein determining whether the port should be in forwarding or blocking state comprises choosing the forwarding state if the connection with the end-device is operative and the connection to the other bridging-devices is inoperative or if the other bridging-devices did not choose the forwarding state.

21. A method according to claim 1, wherein determining whether the port should be in forwarding or blocking state comprises choosing the forwarding state only if no other bridging-device with operative connection to the end-device is in the forwarding state.

22. A method of managing connectivity between an end-device and one of a plurality of bridging-devices connected to the end-device, comprising:
   transmitting test messages by each of the bridging-devices;
   transmitting test messages by the end-device;
   determining, in each of the bridging-devices with which of the other devices there is an operative connection, based on the test messages the bridging-device receives; and
   determining, in each of the bridging-devices, whether a port leading to the end-device should be in a forwarding or blocking state responsive to the determination of the operative connections;
   wherein determining by a bridging-device with which of the other devices there is an operative connection comprises considering a device as having an operative connection with the determining bridging-device if at least a predetermined percentage of the test messages expected to have been transmitted by the other device, are received over a predetermined period by the determining bridging-device.

23. A method according to claim 19, wherein determining by a bridging-device with which of the other devices there is an operative connection comprises considering a device as having an operative connection with the determining bridging-device if at least one of the test messages expected to have been transmitted by the other device, are received over a predetermined period by the determining bridging-device.

24. A method of managing connectivity between an end-device and one of a plurality of bridging-devices connected to the end-device, comprising: transmitting test messages by each of the bridging-devices;
   transmitting test messages by the end-device;
   determining, in each of the bridging-devices, with which of the other devices there is an operative connection, based on the test messages the bridging-device receives;
   determining, in each of the bridging devices, whether a port leading to the end-device should be in a forwarding or blocking state responsive to the determination of the operative connections; and
   moving a port which should be in the blocking state according to the determination, to an emulated blocking state in which at least some test messages carrying destination addresses other than the standard spanning tree algorithm (STA) BPDU address may be transmitted and received through the port but substantially all messages received through the port are not forwarded through any other port of the bridging-device containing the emulated blocking port.

25. A method according to claim 24, wherein moving the port to the emulated blocking state comprises moving the port to a state in which at least some test messages carrying destination addresses other than the standard STA BPDU address may be transmitted and received through the port to and from the processor of the bridging-device.

26. A method according to claim 24, wherein moving the port to the emulated blocking state comprises moving the port to a state in which substantially all messages received through other ports of the bridging-device are not forwarded through the emulated blocking state.

27. A method according to claim 24, wherein moving the port to the emulated blocking state comprises moving the port to a state in which at least some of the messages received through the emulated blocking port are not passed to the processor.

28. A method according to claim 27, wherein moving to a state in which at least some of the messages received through the emulated blocking port are not passed to the processor comprises moving the port to a state in which broadcast and multicast messages received through the port are not passed to the processor.

29. A method according to claim 24, wherein moving the port to the emulated blocking state comprises moving the port to a state in which messages received through the emulated blocking port are not used in matching addresses to ports.

30. A method according to claim 24, wherein moving the port to the emulated blocking state comprises tagging all untagged messages received by the port as belonging to a VLAN to which none of the other ports of the bridging-device belong.

31. A method according to claim 24, wherein moving the port to the emulated blocking state comprises moving the port to a state in which the emulated blocking port transmits and receives only messages of a specific VLAN which is not supported by any of the other ports of the bridging-device.

32. A method of preventing formation of loops in a network comprising a plurality of devices, each having one or more ports, connected by communication links, comprising:
   transmitting test messages by the plurality of devices;
   determining in fewer than all the transmitting devices, which of the ports of the determining device should be in a forwarding state, based on the test messages the determining device receives; and
   setting all the ports of the non-determining transmitting devices, permanently to the forwarding state.

33. A method according to claim 32, wherein the non-determining transmitting devices comprise only a single port each.

34. A method according to claim 32, wherein the non-determining transmitting devices comprise end-stations.

35. A method according to claim 32, wherein the non-determining transmitting devices do not run a software related to the loop prevention method.

36. A method according to claim 32, wherein transmitting test messages by the non-determining devices comprises transmitting response requests to the non-determining devices from one or more of the determining devices and transmitting said test messages in response to the response requests by the non-determining devices.

37. A method according to claim 36, wherein transmitting response requests comprises transmitting ARP requests.

38. A method according to claim 37, wherein transmitting ARP requests comprises transmitting ARP requests with unicast destination addresses.

39. A method according to claim 36, wherein transmitting response requests comprises transmitting Internet Control Message Protocol (ICMP) echo messages.

40. A method according to claim 36, wherein transmitting response requests comprises transmitting response requests with one or more special source addresses which do not belong to any of the devices.

41. A method according to claim 36, comprising configuring the device transmitting the response requests with a IP address of the non-determining device to which the response requests are transmitted.

42. A method according to claim 36, comprising configuring the device transmitting the response requests with a MAC address of the non-determining device to which the response requests are transmitted.

43. A method according to claim 36, comprising determining, by the device transmitting the response requests, of the IP address of the non-determining device to which the response requests are transmitted, from messages unrelated to the loop prevention method transmitted from the non-determining device.

44. A method according to claim 32, wherein the determining transmitting devices comprise bridging-devices.

45. A method according to claim 32, comprising moving at least one of the ports to an emulated blocking state in which test messages may be transmitted and received through the port but all messages received through the port are not forwarded through any other port of the device which comprises the emulated blocking port.

46. A method according to claim 45, wherein moving the at least one of the ports to the emulated blocking state comprises tagging all messages received by the port as belonging to a VLAN to which none of the other ports of the device belong.

47. A method according to claim 45, wherein moving the at least one of the ports to the emulated blocking state comprises moving to a state in which the emulated blocking ports transmit and receive only messages of a specific VLAN not in common with any of the other ports of the device to which the emulated blocking port belongs.

48. A method according to claim 45, wherein moving the at least one of the ports to an emulated blocking state comprises moving ports which lead to non-determining devices.

49. A method of blocking ports to prevent formation of active loops in a network, comprising:
    transmitting messages by at least one first bridging-device to at least one second bridging-device of the network;
    transmitting messages by the at least one second bridging-device to the at least one first bridging-device responsive to the messages from the at least one first bridging-device to the at least one second bridging-device; and
    determining which ports to block responsive to at least the messages transmitted by the at least one second-bridging device received by the at least one first bridging-device;
    wherein transmitting messages from the at least one first bridging-device to the at least one second bridging-device comprises transmitting messages between substantially each pair of directly linked bridging-devices in the network.

50. A method according to claim 49, wherein transmitting messages by the at least one second bridging-device to the at least one first bridging-device comprises transmitting messages which include acknowledgments of the messages from the at least one first bridging-device to the at least one second bridging-device.

51. A method according to claim 49, wherein transmitting messages from the at least one second bridging-device to the at least one first bridging-device comprises transmitting spanning tree algorithm BPDUs.

52. A method according to claim 49, wherein determining which ports to block comprises determining which ports to block, responsive to whether the messages transmitted by the at least one second-bridging device are received.

53. A method according to claim 52, wherein determining which ports to block comprises determining which ports to block, responsive to the contents of the messages received by the at least one first bridging-device.

* * * * *